United States Patent
Wetteborn

[19]

[11] Patent Number: 5,949,530
[45] Date of Patent: Sep. 7, 1999

[54] LASER RANGE FINDING APPARATUS

[75] Inventor: Hainer Wetteborn, Waldkirch/Breisgau, Germany

[73] Assignee: Sick AG, Waldkirch/Breisgau, Germany

[21] Appl. No.: 08/800,162

[22] Filed: Feb. 13, 1997

[30]  Foreign Application Priority Data

Feb. 27, 1996 [DE] Germany ........................ 196 07 345.6

[51] Int. Cl.⁶ .................................................. G01C 3/08
[52] U.S. Cl. .......................................... 356/5.01; 180/169
[58] Field of Search ................................. 356/4.01, 5.01, 356/141.1; 180/169

[56]  References Cited

U.S. PATENT DOCUMENTS

| | | |
|---|---|---|
| 4,111,552 | 9/1978 | Bodlaj . |
| 4,239,388 | 12/1980 | Green . |
| 4,477,184 | 10/1984 | Endo . |
| 4,569,599 | 2/1986 | Bölkow . |
| 4,699,508 | 10/1987 | Bölkow . |
| 4,743,856 | 5/1988 | Keating . |
| 4,939,476 | 7/1990 | Crawford . |
| 5,162,643 | 11/1992 | Currie .................................. 250/206.1 |
| 5,286,969 | 2/1994 | Roberts . |
| 5,291,262 | 3/1994 | Dunne . |
| 5,604,580 | 2/1997 | Uehara ...................................... 356/28 |
| 5,682,229 | 10/1997 | Wangler ................................ 356/4.01 |

FOREIGN PATENT DOCUMENTS

| | | |
|---|---|---|
| 2607187 | 8/1977 | Germany . |
| 32 19 452 C2 | 4/1986 | Germany . |
| 289 610 | 5/1991 | Germany . |
| 4108376A1 | 12/1992 | Germany . |
| 41 19 797 C2 | 2/1994 | Germany . |
| 4340756 A1 | 6/1994 | Germany . |
| 4340756A1 | 6/1994 | Germany . |
| 43 04 344 A1 | 8/1994 | Germany . |
| 4305011A1 | 8/1994 | Germany . |
| 4406865A1 | 9/1994 | Germany . |
| 43 41 080 C1 | 9/1995 | Germany . |
| 19531632A1 | 3/1996 | Germany . |
| 2205640 | 12/1988 | United Kingdom . |
| WO 94/08254 | 4/1994 | WIPO . |

OTHER PUBLICATIONS

Patent Abstracts of Japan, vol. 015, No. 251 (P–1220), Jun. 26, 1991 & JP 03 081687 A (NEC Corp), Apr. 8, 1991, Abstract.

Primary Examiner—Stephen C. Buczinski
Attorney, Agent, or Firm—Townsend and Townsend and Crew LLP

[57]  ABSTRACT

A laser range finding apparatus comprises a pulse laser (11), a light deflecting device, a photodetector arrangement (22) having an opto-electronic photodetector (23) and also an electronic control and evaluation system (10) in which a sensing signal representative for the range of an object is determined in accordance with the pulse transit time method from the time between the transmission and reception of a light pulse taking account of the speed of light. The electronic control and evaluation system (10) includes means for measuring the total electrical charge which has flowed via the photodetector (23) during the reception of a light pulse and/or for the measurement of the pulse width of the received light pulse. The compensation takes place as a result of the transit time measurement errors which arise as a result of the signal dynamics in dependence on the measured electrical charge or pulse width on the basis of respective correction values which were determined by the electronic control and evaluation system with respect to charges or pulse widths and pulse transit times, which were measured with respect to at least one reference object (86) having different reflectivities and arranged at a defined range from the light deflecting device (15).

21 Claims, 5 Drawing Sheets

Fig. 7
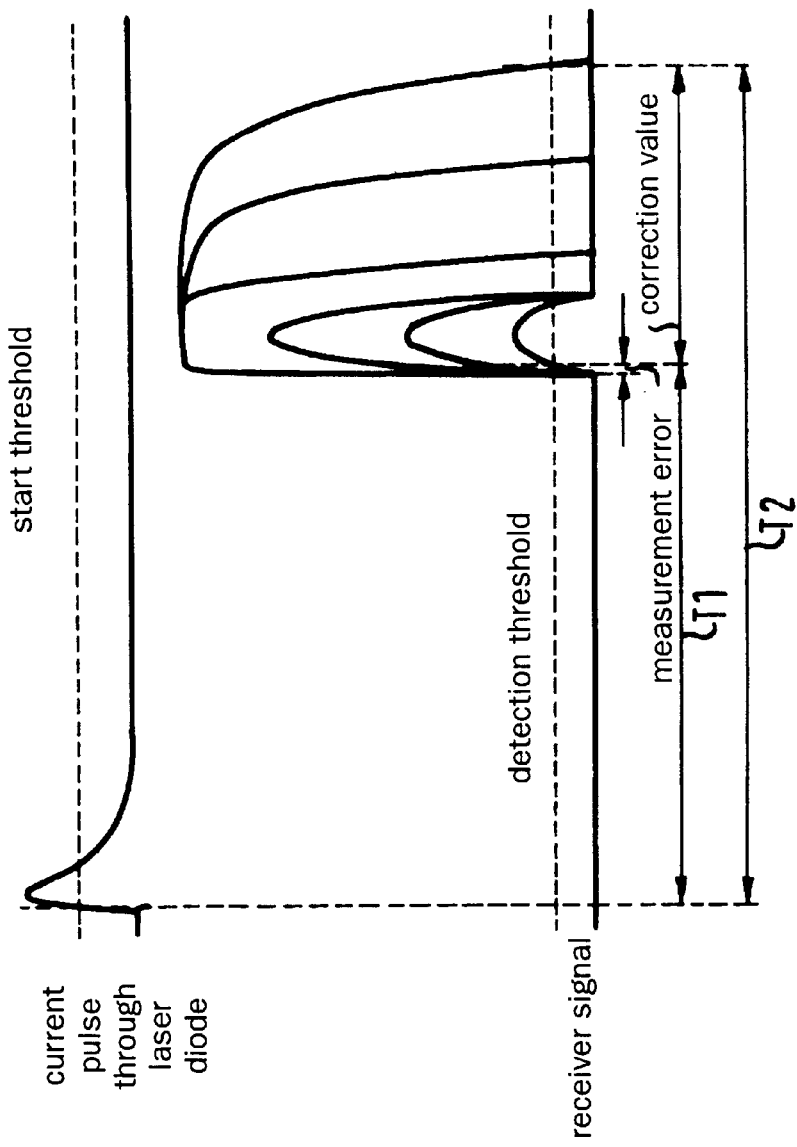
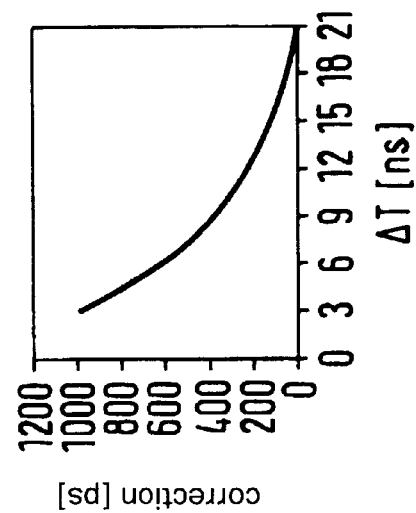

LASER RANGE FINDING APPARATUS

FIELD OF THE INVENTION

The invention relates to a laser range finding apparatus comprising a pulsed laser, a light deflecting device, a photodetector arrangement having an opto-electronic photodetector and an electronic control and evaluation system, wherein the pulsed laser is controlled to transmit light pulses and the sequential light pulses that are transmitted are deflected via the light deflecting device at changing angles into a measurement region, wherein the light pulses reflected back from an object located in the measurement region are received by the photodetector arrangement, wherein a sensing signal representative for the range of the object from the light deflecting device is found in the electronic control and evaluation system in accordance with the pulse transit time method from the time between the transmission and the reception of a light pulse on taking account of the speed of light, and wherein a compensation is also effected for transit time measurement errors arising as a result of the signal dynamics.

PRIOR ART AND TECHNICAL BACKGROUND

A laser range finding apparatus of this kind is known from German patent publication DE 43 40 756 A1. With a laser radar of this kind one can not only determine the range of the objects struck by the light pulses but also the angle at which the object is arranged with respect to a predeterminable reference direction in space. The object's range is determined, starting from the measured pulse transit time, by taking account of the speed of light. In this arrangement the accuracy of this range determination is essentially dependent on the three following influencing parameters:

a) the resolution of the time measuring unit associated with the electronic control and evaluation system, b) the noise which is superimposed on the received signal, and c) the accuracy of the compensation which takes place in the electronic control and evaluation system of transit time measurement errors resulting from the signal dynamics.

A statistical measurement error results from the first two influencing parameters a) and b), which can be reduced by average value formation over a plurality of measurements. More critical is the third influencing parameter c), which is primarily to be attributed to the fact that the linear range of amplification of the pre-amplifier, which is as a rule connected after the opto-electronic photodetector, is restricted in comparison to the signal dynamics which arise in practice. Accordingly, the compensation of the transit time measurement errors which arise as a result of the signal dynamics in dependence on the measured peak value of the received light pulse on the basis of correspondingly determined correction values, as effected in the laser radar known from DE 43 40 756, only leads to the desired result in a relatively small range of modulation. If, in contrast, a modulation of the pre-amplifier takes place beyond its linear amplification range, then saturation effects arise which can, in particular, bring about an extended time duration of the output signal of the pre-amplifier. This can lead to transit time measurement errors, which can no longer be compensated by the peak value detection. This can, in particular, be the case when the trailing flank or the flank arising at the end of the output signal is also used for the transit time determination. In addition to this comes the fact that these effects are strongly dependent on temperature, voltage and batch.

OBJECT OF THE INVENTION

The object of the invention is to provide a laser range finding apparatus of the initially named kind, which always ensures a reliable compensation of the transit time measurement errors which arise as a result of the signal dynamics in a simple manner, with account in particular being taken of the different operating conditions and different reflectivities of the respective object.

BRIEF DESCRIPTION OF THE INVENTION

The object is satisfied in accordance with the invention in that the electronic control and evaluation system includes means for measuring the total electrical charge which has flowed via the photodetector during the reception of a light pulse and/or for measuring the pulse width of the received light pulse; and in that the compensation of the transit time error which occurs as a result of the signal dynamics takes place in dependence on the measured electrical charge and/or the pulse width on the basis of respective correction values which are determined by the electronic control and evaluation system as a result of charges and/or pulse widths and pulse transit times which were measured with respect to at least one reference object arranged at a defined distance from the light deflecting device and having different reflectivities. By using a reference object having different reflectivities, it is possible to take account in the simplest manner of all the reflectivities which arise in practice in conjunction with the respective objects, and to find the corresponding correction values. Since the range of the reference object from the light deflection device is known, the respective desired transit time is also known. The deviation between the actually measured pulse transit time and the desired transit time can then be used as a measure for the relevant correction value or to form a corresponding correction function. The association of the derived correction values or correction functions with the respective reflectivities takes place in such a way that they are associated with the respectively measured charges and/or pulse widths. During the reception of a light pulse reflected back from an object located in the measurement range, the total electrical charge which has flowed via the photodetector or the pulse width of this received light pulse is then first measured during reception of this light pulse, whereupon the corresponding correction value can be called up or the corresponding correction function can be activated. The charge measurement takes place independently of the transit time measurement, i.e. via a special charge measurement circuit, so that a possible overmodulation of a pre-amplifier associated with the relevant transit time measurement circuit has no influence on the charge measurement. In contrast, it is fundamentally possible to determine the pulse width via the respective transit time measurement circuit. After the compensation of the transit time measurement errors which have occurred as a result of the signal dynamics in dependence on the measured electrical charge or pulse width, any possibly occurring overmodulation of a pre-amplifier associated with the transit time measurement and the associated saturation effects has no influence on this compensation. A substantial advantage of the laser range finding apparatus of the invention is, in particular, also to be seen in the fact that it is not necessary that a certain reflectivity is present at a defined position of the reference object. This reference object need be neither calibrated nor aligned. No significance at all is attributed to possible aging effects. It is only necessary for the reference object to be arranged at a defined spacing from the light deflecting device and to have reflectivities which also arise in practical use in the scenario to be measured.

The reference object is expediently arranged outside of a defined, monitored angular scanning range so that it is also swept over outside of this range by the transmitted pulsed light beam deflected with the continuously changing angles. The detection of the respective object in the angular scanning range is thus not disturbed by the reference object. The reference object can also lie in the object.

In the case of a continuous reference object this can have a changing reflectivity, in particular a steplessly changing reflectivity, and it is expedient if all the reflectivities which arise in practical use with the respective objects to be detected also arise.

Alternatively, the reference object can, however, also be formed by a specific number of reference object elements, whose surfaces, which are struck one after the other by the transmitted pulsed light beam, have different reflectivities. In this case the measurement values which are obtained with respect to the reference object elements arranged at the same distance from the light deflecting device can be combined together in the electronic control and evaluation system by a suitable polynomial, so that the possibility exists of determining intermediate values, optionally via the polynomial.

The reference object can be advantageously scanned before and/or during the normal operation of the apparatus in order to obtain the measurement values required for the determination of the correction values. A repeated scanning is, in particular, preferably possible during the operation, whereby the correction values are always adapted to the actual operating conditions.

In a variant which is preferred in practice, the compensation of the transit time errors which arise as a result of the signal dynamics first takes place in the electronic control and evaluation system in dependence on the measured electrical charge and on the basis of corresponding derived correction values or functions, when the measured pulse width of the received light pulse has exceeded a specific boundary value. This boundary value can preferably be at least substantially the same as two to ten times the pulse width of the transmitted light pulse. If this boundary value is exceeded, then this is an indication that the relevant preamplifier is extremely overmodulated, so that the compensation now expediently takes place in dependence on the measured electrical charge.

Further advantageous embodiments of the laser range finding apparatus of the invention are set forth in the subordinate claims.

BRIEF LISTING OF THE DRAWINGS

The invention will be explained in more detail in the following with reference to embodiments and to the drawing in which are shown:

FIG. 1 is the layout of a laser range finding apparatus realized as a laser radar seen in a schematic view, FIG. 2 is a schematic plan view of the rotary mirror of FIG. 1 and of the angular scanning range, FIG. 3 is a signal voltage/time diagram for received light pulses of different strengths, FIG. 4 is a further signal voltage/time diagram of received light pulses of different strengths, with the signal obtained with overmodulation being contrasted with two signals which lie within the linear range of the relevant preamplifier, FIG. 5 is a view similar to FIG. 1, with the rotary mirror in a position turned through 90° in order to illustrate the function of a reference object introduced into the beam path, FIG. 6 is a part of the electronic control and evaluation system of the laser radar including the charge measurement means, and FIGS. 7a and 7b are correction curves of an amplitude correction.

DESCRIPTION OF PREFERRED EMBODIMENTS

Figure 1:
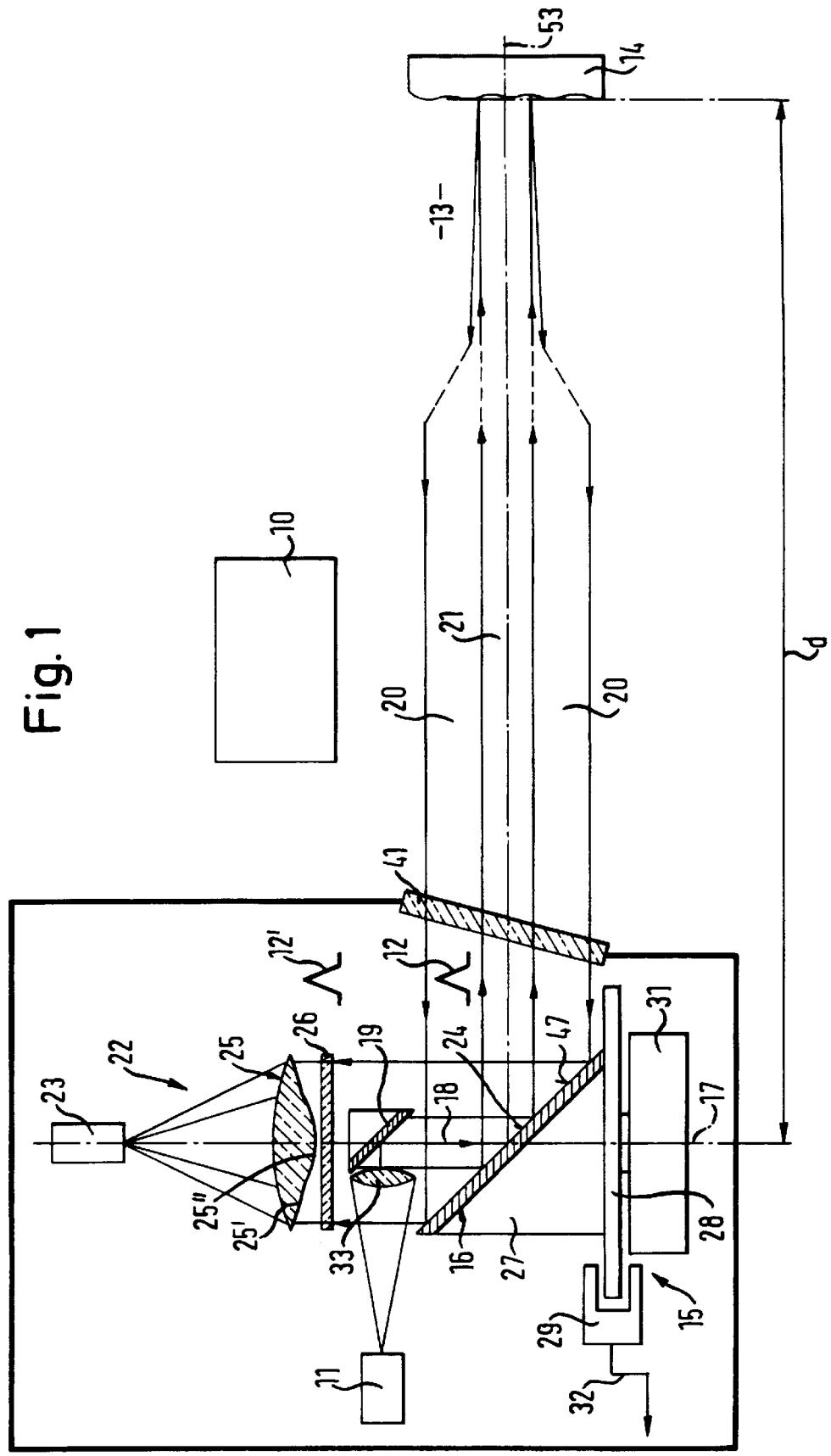

In accordance with FIG. 1 a motor 31 drives a horizontal rotary plate 28 to execute a continuous rotating movement about a vertical axis 17. An angle of rotation transducer 29 is provided at the periphery of the rotary plate 28 and is formed as a forked light barrier and connected via a line 32 to a non-illustrated control stage of an electronic control and evaluation system 10.

A circularly cylindrical body 27 is so arranged on the rotary plate 28 that its upper end face, which is formed as a rotary mirror 16, is arranged at an angle of 45° to the axis of rotation 17. The rotary mirror 16 can also be formed in a non-illustrated manner on a mirror plate, which is secured to the rotary plate 28 via a mirror carrier. Above the rotary mirror 16 there is arranged a likewise flat deflection mirror 19, which is of substantially narrower shape and the mirror surface of which has an angle of 45° to the axis of rotation 17. The mirror 19 can also be realized as a circularly cylindrical body. The deflection mirror 19 can, however, also be formed as a flat mirror plate.

A central region 24 of the deflection mirror 16 receives light from a pulsed laser 11 via a transmitter lens 33 and the deflection mirror 19. The light beam, which is initially horizontal, is deflected downwardly at the reflection mirror 19 in order to then be deflected by the rotary mirror 16 into a horizontal direction to a front disk 41 of the laser radar. From there, the transmitted pulsed light beam 21 enters into the measurement region 13 in which, for example, a light reflecting object 14 is assumed to be present. Scattered light passes from the object 14 as a received pulsed light beam 20 through the front disk 41 back to the rotary mirror 16 in the sense of an auto-collimation beam path.

The received pulsed light beam 20 is incident on a ring area 47 of the rotary mirror 16 to the side of the central region 24, on which the transmitted light 21 and in particular the central instant light beam 18 fall, and is then reflected past the deflection mirror 19 to an interference filter 26, behind which a receiving lens 25 is arranged. This receiving lens 25 has regions 25', 251"of different focal length, in order to be able to also recognize objects arranged very close to the laser radar without problem.

The receiver lens 25 concentrates the received light onto a photodetector 23. It forms, together with the photodetector 23, a photodetecting arrangement 22.

The rotary mirror 16, the rotary plate 28 and the motor 31 are part of a light deflecting device 15, which permits the transmitted pulsed light beam 21 and the received pulsed light beam 20 to rotate around the axis of rotation 17. In this manner an angular scanning region of up to 360° can be realized.

Figure 2:
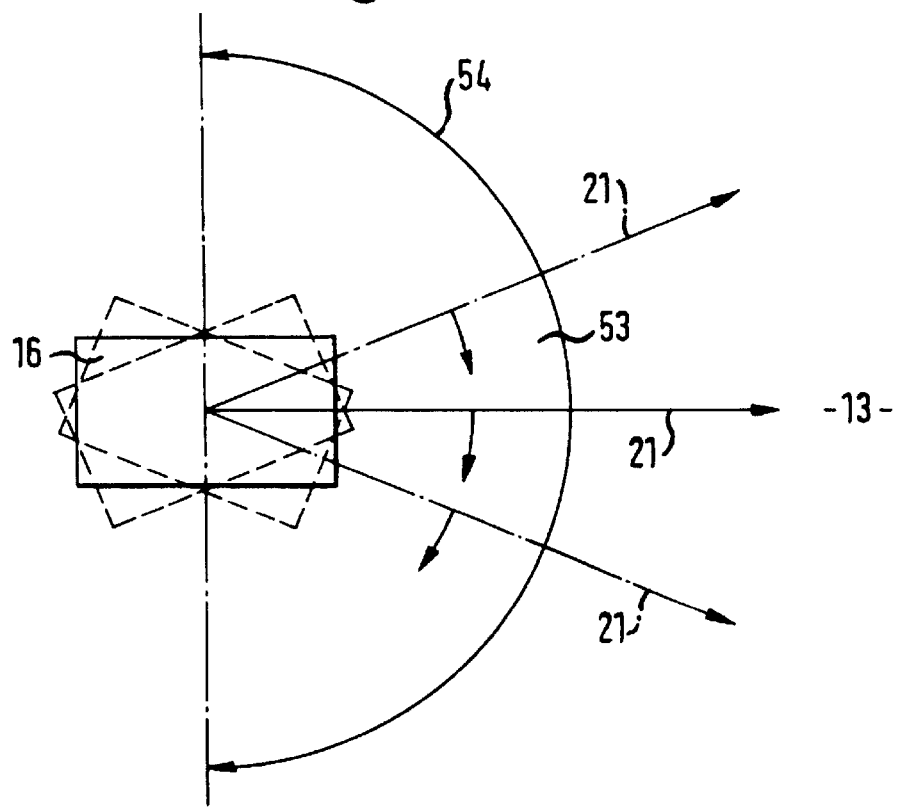

In accordance with FIG. 2 the front disk 41, however, extends only over an angle of approximately 180°, which is, for example, adequate for the monitoring of the region located in front of a vehicle.

In FIG. 2 there are shown, in addition to the plan view of FIG. 1, two further angular positions of the rotary mirror 16 and of the transmitted light beam 21. The transmitted pulsed light beam 21, which executes an angular scan, defines a scanning plane 53. The maximum angular scanning range 54 extends, in accordance with FIG. 2, over 180°.

In the present embodiment the pulsed laser 12 is controlled by the electronic control and evaluation system 10 to transmit light pulses with a duration of 3 to 4 nanoseconds (ns). In other embodiments, the light pulse duration can lie, for example, between 1 and 50 ns. Moreover, the light deflection device 15 is also coupled to the electronic control and evaluation system 10. It is, for example, set rotating with a speed of rotation of 1,500 rpm. The speed of rotation can generally lie in a range from, in particular, 500 to 10,000 rpm. The angular position of the light deflecting device 15 is communicated at each instant by the angular position transducer 29 via a line 32 to, for example, a control stage associated with the electronic control and evaluation system 10.

Figure 4:
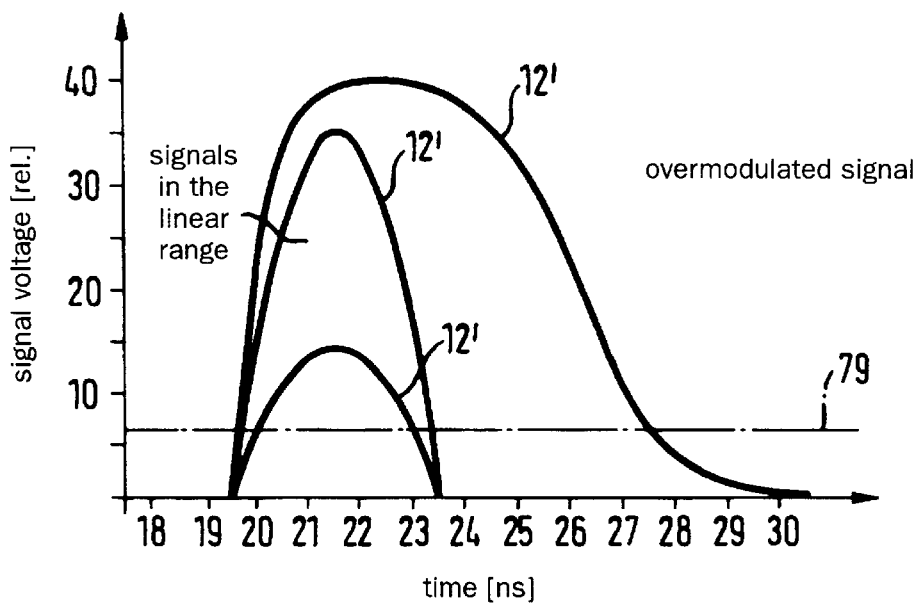
Figure 5:
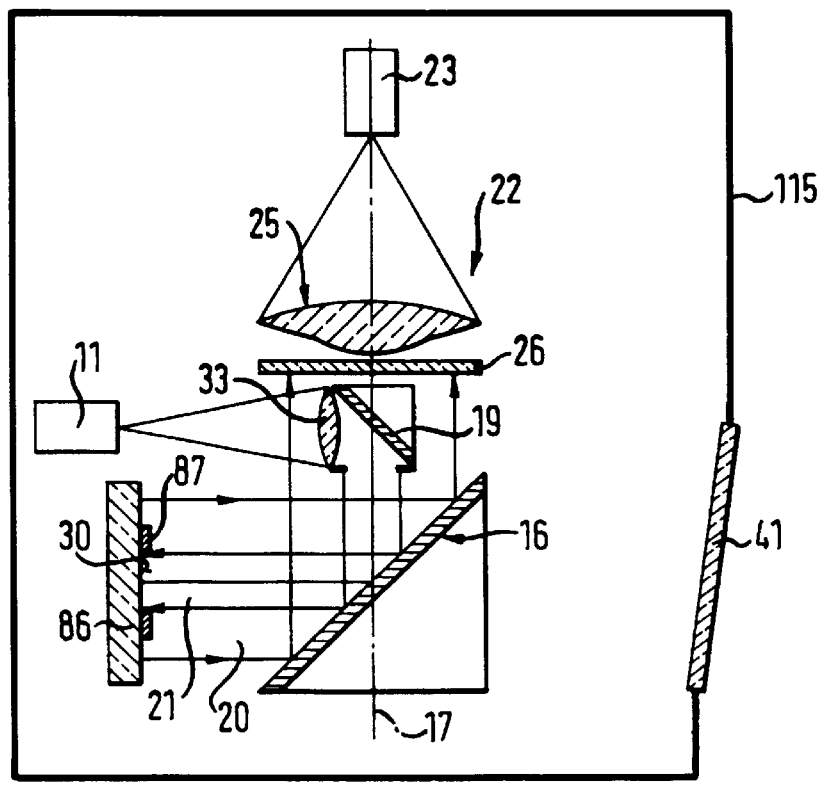

Light pulses 12 are transmitted into the measurement region 13 via the transmitter lens 33 and the mirrors 19, 16 (see FIGS. 1 and 5). They are received after a transit time T as received light pulses 12' (see FIG. 1) by the photodetector arrangement 22. The photodetector 23 which is formed in the present case by a photodiode, in particular by an avalanche diode (see FIGS. 1, 5 and 6), generates from this a corresponding electrical signal, which is amplified by a preamplifier, in the illustrated example by a transimpedance amplifier 38 (see FIG. 6), and is subsequently supplied to an input of a comparator 34. This comparator 34 has, in addition, a reference input 35 defining a detection threshold 79 (see FIGS. 3 and 4), the output signal of which is in particular used for the measurement of the pulse width of the received light pulse 12' and, in the present case, simultaneously for the transit time measurement. The transimpedance amplifier 38 and also the comparator 34 (see FIG. 6) are associated with the electronic control and evaluation system 10 (see FIG. 1).

Figure 6:
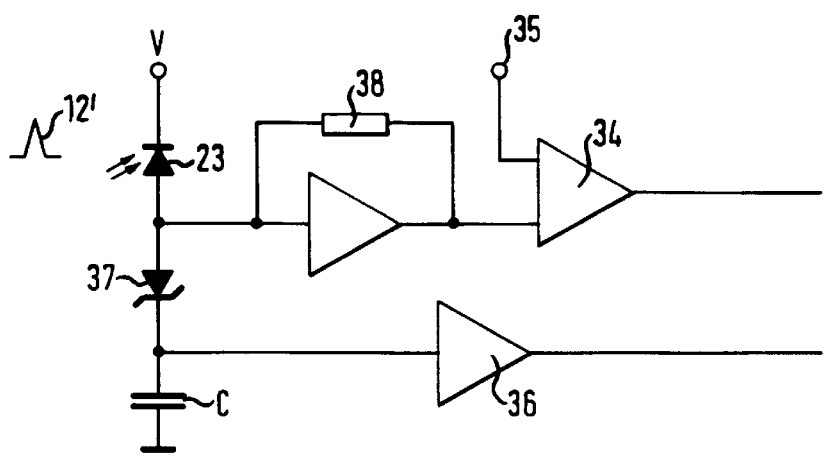

In accordance with FIG. 6 means are also provided for measuring the total electrical charge which has flowed via the photodetector 23 during the reception of a light pulse 12. The means include a capacitor C connected in series with the photodetector 23 via a Schottky diode 37, and also a buffer amplifier 36 connected after the capacitor C. The free end of the capacitor C is connected to earth, whereas the cathode of the photodetector 23 lies at a potential V to generate a corresponding bias voltage.

These means C, 36, 37 for measuring the total electric charge, which has flowed via the photodetector 23 during the reception of a light pulse 12', are part of the electronic control and evaluation system 10 (see FIG. 1) in the same way as the means 34, 38 for measuring the pulse width of the received light pulse 12' and for the transit time measurement.

The output signal of the comparator 34 can, for example, be applied to a counter (not shown) of the electronic control and evaluation system 10, with the counter being clocked by a frequency generator.

The electronic control and evaluation system 10 can, in particular, also include a microprocessor.

The non-shown counter associated with the electronic control and evaluation system 10 is started on the transmission of a respective light pulse 12. As soon as a corresponding light pulse 12' is received by the photodetector arrangement 22, this counter is stopped via the output signal of the comparator 34. The pre-condition for this is that the relevant detection threshold 79 (see also FIGS. 3 and 4) was exceeded. The results of the count are then subsequently used, for example, by the microprocessor to calculate the relevant pulse transit time T and from this the range d of the object 14 from the light deflecting device in accordance with the following formula:

$$d = c \cdot t / 2,$$

where c is the speed of light.

Since the instantaneous angular position of the light deflecting device 15 is also communicated to, for example, the microprocessor of the electronic control and evaluation system 10 via the line 32 (see FIG. 1), a corresponding information concerning the polar coordinates of the object 14 can, for example, now be passed on to an interface associated with the electronic control and evaluation system 10, where it is then available for further use, for example as a navigation signal or as an error signal.

As can be seen from FIG. 5, a reference object 86 is arranged outside of the defined, monitored angular scanning range 54 (see also FIG. 2) and is thus swept over outside of this monitored angular scanning range 54 by the transmitted pulsed light beam 21, which is deflected with increasingly changing angles.

In the illustrated embodiment a blackened ring diaphragm 87 can be provided at the edge of a surface 30 of the reference object 86, which is struck by the transmitted pulsed light beam 21, and which prevents undesired scattered light effects.

The surface 30 of the reference object 86 arranged outside of the defined monitored angular scanning range 54, which is illuminated by the transmitted pulsed light beam 21, has different reflectivities. In this respect, this surface 30 preferably extends along a circular arc concentric to the axis of rotation 17 of the rotatable light deflection device 15, with the reflectivity preferably changing in stepless manner along the circular arc.

This surface 30 can be formed by a foil, undercoat or the like, which has a high initial reflectivity and which is increasingly being painted over with black die. As an alternative, the reference object 86 can also be formed by a specific number of reference object elements, which preferably lie at a mutual spacing on a circular arc concentric to the axis of rotation 17 of the rotatable light deflection device 15, with the surfaces of the different reference object elements illuminated one after the other by the transmitted pulsed light beam 21 having different reflectivities.

In this connection, the measured values obtained with respect to the test object elements arranged at the same spacing from the light deflection device 15 can be combined by a polynomial, and intermediate values can be determined via the polynomial.

In accordance with FIG. 5 the laser range finding apparatus formed by a laser radar is accommodated in a housing 115, with the front disk 41, which is curved over 180°, being provided in the lower region of the housing.

Figure 3:
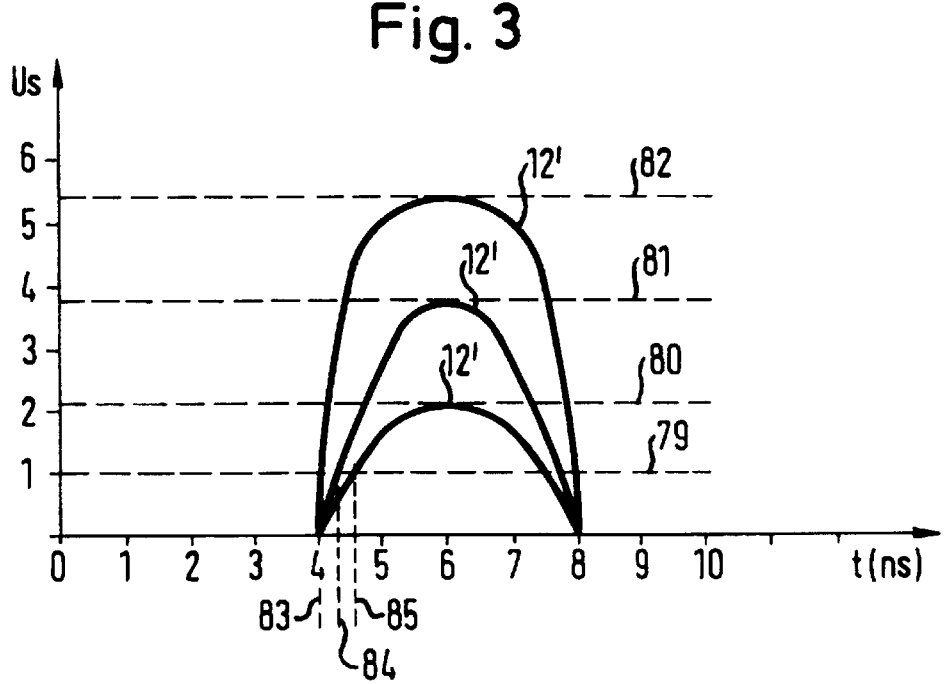

As can be seen from FIGS. 3 and 4, transit time measurement errors can arise as a result of the signal dynamics and are compensated by the laser range finding apparatus of the invention in the manner which has yet to be described.

In FIG. 3 there are shown three different light pulses 12', which have been received via the opto-electronic photodetector 23 of the photodetector arrangement 22, and amplified via the transimpedance amplifier 38 (see FIG. 6) serving as a pre-amplifier. These light pulses achieve a maximum signal voltage of 80, 81 and 82 respectively. As a result of a correspondingly low noise threshold, all received light pulses 12' admittedly exceed the detection threshold 79 set at the reference input 35 of the comparator 34. However, the time t after the rising flank of the three received different light pulses 12' has exceeded the detection threshold 79 is different. In the illustrated embodiment the time difference can, for example, amount to 1.2 ns, which corresponds to a measurement error of approximately 20 cm. This time and measurement error (for example 84, 85 for the signals with the maximum values 80, 81) with respect to the base time 83 for the light pulse 12' with the greatest maximum value 82 can, for example, be stored in the microprocessor of the electronic control and evaluation system 10 and be correspondingly made available for correction purposes.

As long as the pre-amplifier, in the present case the transimpedance amplifier 38 (see FIG. 6), is operated in the linear amplification range, it is basically possible to effect the compensation of the transit time error which arises as a result of the signal dynamics in dependence on the maximum or peak values 80, 81, 82 (see FIG. 3), which is, for example, possible by means of a peak value detector.

As can be seen from FIG. 4, this is, however, no longer straightforwardly possible when the pre-amplifier or the transimpedance amplifier 38 is operated beyond its linear range, at least not when the falling flank is also used for the transit time measurement. As FIG. 4 shows, the saturation effects associated with overmodulation namely lead to a situation in which the relevant output signal of the pre-amplifier is extended time-wise, i.e. the trailing flank falls below the detection threshold 79 again at a substantially later point in time (see FIG. 4, overmodulated signal).

In accordance with the invention the electronic control and evaluation system 10 is so laid out that the compensation of the transit time measurement error arising as a result of the signal dynamics takes place by way of the already described means C, 36, 37; 34, 38 for the measurement of the total electrical charge which has flowed via the photodetector 23, or for the measurement of the pulse width of the received light pulse 12' in dependence on the measured electrical charge or pulse width, and also on the basis of respective correction values which were found by the electronic control and evaluation system 10 with respect to charges or pulse widths and pulse transit times, which were measured with respect to at least one reference object 86 (see FIG. 5) having different reflectivities and arranged at a defined spacing from the light deflection device 15.

The different reflectivities of the surface 30 of the reference object 86 act one after the other inasmuch as the reference object 86 is swept over by the transmitted pulsed light beam 21. The correction values required for the compensation can now be determined by the electronic control and evaluation system 10, with reference to the charges, pulse widths and pulse transit times, which were measured with respect to the reference object 86. Since the distance of the reference object 86 to the light deflection device 15 is known, the desired transit time can be straightforwardly determined, with which the actually measured pulse transit times can then be compared. The transit time deviations can then serve as a measure for the respective correction values or correction functions. The resulting correction values can, for example, be stored in the electronic control and evaluation system 10.

If a respective object 14 (see FIG. 1) is then detected in the angular scanning range 54 (see, for example, FIG. 2), then the electrical charge which has flowed via the photodetector 23 during the reception of the light pulse and/or the pulse width of the received light pulse is first measured during the reception of the light pulse, whereupon the associated, previously determined correction value can then be called up or a corresponding correction function can be activated. A possible overmodulation of the pre-amplifier or of the transimpedance amplifier 38, and thus the associated saturation effects, has no influence on the relevant compensation and thus on the accuracy of the range measurement.

As already mentioned, the means for measuring the total electrical charge which has flowed via the photodetector 23 during the reception of a light pulse 12' comprise the capacitor C connected in series via the Schottky diode 37 with the opto-electronic photodetector 23 and also the buffer amplifier connected after it (see FIG. 6).

The pulse width can be measured, for example, by means of a counter (not shown), which is likewise associated with the electronic control and evaluation system 10 and which is controlled via the output signal of the comparator 34 (see FIG. 6). The output signal of this comparator 34 is simultaneously used in the present case for the transit time measurement.

A higher measurement accuracy can be achieved, amongst other things, when the measured values obtained during a specific number of scans with respect to the reference object 86 are averaged in the electronic control and evaluation system 10.

The electronic control and evaluation system 10 can be so laid out, in accordance with a preferred embodiment, that the compensation of the transit time measurement errors which arise as a result of the signal dynamics first takes place in dependence on the measured electrical charge and on the basis of correspondingly determined correction values, when the measured pulse width of the received light pulse 12' has exceeded a specific boundary value. This boundary value can, for example, be at least substantially the same as the value of the pulse width of the transmitted light pulse 12. This boundary value is thus an indication of the fact that the pre-amplifier or transimpedance amplifier 38 was overmodulated (see FIG. 4, overmodulated signal). The compensation previously took place, for example in dependence on the respectively measured pulse widths.

If measurements are now effected at different positions of the reference object 86, then the output pulse width in the linear and non-linear modulation range of the pre-amplifier, or the amplitude determined via the charge measurement, can be plotted with respect to the transit time found with a given threshold.

Since the range of the reference object 86 from the light deflection device 15 is known, a correction function can thus be directly formed, which also applies to measurements in the outer scenario. In order to improve the resolution, an average value formation can be carried out in the electronic control and evaluation system 10, as already mentioned.

It has already been stated that, on the one hand, the pulse widths and, on the other hand, the charge can be measured. With respect to FIG. 7 an example will now be described of a signal evaluation, which takes place in the electronic control and evaluation system 10, and in which a correction of the measured range takes place in dependence on the measured pulse width of the received light pulse for the compensation of the transit time measurement error arising as a result of the signal dynamics. In accordance with the diagram of FIG. 7b, in which the signal amplitude is recorded with respect to time, the time T between the transmission of the light pulse and the appearance of the rising flank of the received light pulse is measured. The measured time T2 gives the time between the transmission of the light pulse and the appearance of the falling flank of the received light pulse. In this connection a respective flank is detected by making a determination as to when it passes the detection threshold. The pulse width of the received light beam can then be determined from the two values T1, T2. The value of the pulse width is equal to T2−T1, or the same as the magnitude of T1−T2. FIG. 7a now shows a correction diagram in which a correction value quoted in ps is shown with respect to the measured pulse width ΔT. This correction curve, which starts with a value of the measured pulse width of the order of magnitude of 3 ns, is used for a correction of the measured range in accordance with the following relationship:

$$R = [T1 - \text{measurement error}] \times c/2$$
$$= T1 \times c/2 - F(T1 - T2) \times c/2$$
$$= \text{measured range} - \text{correction}(\Delta T),$$

where

R=corrected range

F=measurement error as a function of the measured pulse width

ΔT=measured pulse width c=speed of light.

It is not necessary that a specific reflectivity is present at a defined position of the reference object 86. The reference object 86 does not have to be either calibrated or aligned. Aging effects remain without influence. The reflectivities of the surface 30 of the reference object 86 are expediently so selected that they either take account of all the reflectivities which arise in the outside scenario or so that specific reference points are formed which can be linked by a polynomial of suitable degree in order to be able to determine intermediate values with respect to the polynomial.

Thus, a reliable compensation of the transit time measurement error arising as a result of the signal dynamics is achieved in each case. A scenario with any desired reflectivities can be sensed without systematic measurement errors. Measurement accuracies of down to 1 mm can be achieved in this way by average value formation over a plurality of scans.

The reference object can be sensed before and/or during the normal operation of the laser radar in order to obtain the measured values necessary to determine the correction values. Repeated scanning is in particular preferably also possible during the operation, whereby the correction values can always be adapted to the actual operating conditions.

In other respects, the laser range finding apparatus and in particular the electronic control and evaluation system 10 can be laid out in the manner which is described in the initially named DE 43 40 756 A1 or in the corresponding U.S. Pat. No. 5,455,669.

REFERENCE NUMERAL LIST

| | |
|---|---|
| 10 | electronic control and evaluation system |
| 11 | pulsed laser |
| 12 | transmitted light pulse |
| 12' | received light pulse |
| 13 | measurement region |
| 14 | object |
| 15 | light deflection device |
| 16 | rotary mirror |
| 17 | housing |
| 18 | central incident light beam |
| 19 | deflection mirror |
| 20 | received pulsed light beam |
| 21 | transmitted pulsed light beam |
| 22 | photodetector arrangement |
| 23 | opto-electronic photodetector |
| 24 | central region |
| 25 | receiver lens |
| 25', 25" | ranges of different focal length |
| 26 | interference filter |
| 27 | circularly cylindrical body |
| 28 | rotary plate |
| 29 | angular position transducer |
| 30 | surface |
| 31 | motor |
| 32 | line |
| 33 | transmitter lens |
| 34 | comparator |
| 35 | reference input |
| 36 | buffer amplifier |
| 37 | Schottky diode |
| 38 | transimpedance amplifier |
| 41 | front disk |
| 47 | ring area |
| 53 | scanning plane |
| 54 | angular scanning range |
| 79 | detection threshold |
| 80 | signal voltage |
| 81 | signal voltage |
| 82 | signal voltage |
| 83 | base time |
| 84 | time measurement error |
| 85 | time measurement error |
| 86 | reference object |
| 87 | ring diaphragm |
| 115 | housing |
| C | capacitor |

What is claimed is:

1. Laser range finding apparatus comprising a pulsed laser (11), a light deflecting device (15), a photodetector arrangement (22) having an opto-electronic photodetector (23) and an electronic control and evaluation system (10), wherein the pulsed laser (11) is controlled to transmit light pulses (12) and the sequential light pulses (12) that are transmitted are deflected via the light deflecting device (15) at changing angles into a measurement region (13), wherein the light pulses (12') reflected back from an object (14) located in the measurement region (13) are received by the photodetector arrangement (22), wherein a sensing signal representative for the range of the object (14) from the light deflecting device (15) is found in the electronic control and evaluation system (10) in accordance with the pulse transit time method from the time between the transmission and the reception of a light pulse (12, 12') on taking account of the speed of light, and wherein a compensation is also effected for transit time measurement errors arising as a result of signal dynamics, characterized in that the electronic control and evaluation system (10) includes means (C, 36, 37; 34, 38) for measuring the total electrical charge which has flowed via the photodetector (23) during the reception of a light pulse (12') and/or for measuring the pulse width of the received light pulse (12'); and in that the compensation of the transit time error which occurs as a result of the signal dynamics, takes place in dependence on the measured electrical charge and/or the pulse width on the basis of respective correction values which are determined by the electronic control and evaluation system (10) as a result of charges and/or pulse widths and pulse transit times which were measured with respect to at least one reference object (86) arranged at a defined distance from the light deflecting device (15) and having different reflectivities.

2. Apparatus in accordance with claim 1, characterized in that the reference object (86) is arranged outside of a defined, monitored angular scanning range (54) and is swept over by the transmitted pulsed light beam (21) deflected with continuously changing angles.

3. Apparatus in accordance with claim 1, characterized in that the reference object (86) has a surface (30) of changing reflectivity, and preferably steplessly changing reflectivity, which is struck by the transmitted pulsed light beam (21), and which extends along a circular arc concentric to the axis of rotation (17) of the rotatable light deflecting means (15), whereby the reflectivity changes along the circular arc.

4. Apparatus in accordance with claim 3, characterized in that the surface (30) is formed by a foil, undercoat or the like of high initial reflectivity, which is increasingly painted with black paint.

5. Apparatus in accordance with claim 1, characterized in that the reference object (86) is formed by a specific number of reference object elements which preferably lie at a mutual spacing on a circular arc concentric to the axis of rotation (17) of the rotatable light deflecting device (15); and in that the surfaces of the different reference object elements, which are struck one after the other by the transmitted pulsed light beam (21), have different reflectivities.

6. Apparatus in accordance with claim 5, characterized in that the measured values which are received with respect to the reference object elements arranged at the same distance from the light deflecting device (15) are linked together by a polynomial and that intermediate values are determined via the polynomial.

7. Apparatus in accordance with claim 1, characterized in that the light deflecting device (15) sweeps over a 360° deflection angle and preferably continuously rotates in one direction of rotation.

8. Apparatus in accordance with claim 1, characterized in that the means (C, 36, 37) for the measurement of the total electrical charge which has flowed via the photodetector (23) during the reception of one light pulse (12') includes a capacitor (C) connected in series to the photodetector (23) and also a buffer amplifier (36) connected after the capacitor.

9. Apparatus in accordance with claim 8, characterized in that the capacitor (C) is connected in series via a diode, preferably a Schottky diode (37), with the photodetector (23).

10. Apparatus in accordance with claim 1, characterized in that the photodetector (23) is connected via a preamplifier, preferably via a transimpedance amplifier (38), to one input of a comparator (34), which is, moreover, provided with a reference input (35) defining a detection threshold (79) and the output signal of which is used in particular for the measurement of the pulse width of the received light pulse (12').

11. Apparatus in accordance with claim 10, characterized in that the output signal of the comparator (34) is simultaneously used for the transit time measurement.

12. Apparatus in accordance with claim 1, characterized in that the reference object (86) is repeatedly sensed before and/or during the normal operation of the apparatus in order to obtain the measurement values required for the determination of the correction values.

13. Apparatus in accordance with claim 1, characterized in that measurement values obtained during a specific number of scans with respect to the reference object (86) are averaged to improve the accuracy in the electronic control and evaluation system (10).

14. Apparatus in accordance with claim 1, characterized in that the compensation in the electronic control and evaluation system (10) of the transit time measurement errors which arise as a result of the signal dynamics first takes place in dependence on the measured electrical charge and on the basis of corresponding derived correction values or correction functions, when the measured pulse width of the received light pulse (12') has exceeded a specific threshold value.

15. Apparatus in accordance with claim 14, characterized in that the threshold value is at least substantially the same as the value of two to ten times and in particular of two to five times the pulse width of the transmitted light pulse (12), or corresponds to a value at which the pre-amplifier is greatly overmodulated or saturated.

16. Apparatus in accordance with claim 1, characterized in that the electronic control and evaluation system (10) includes a time measurement unit for the determination of the transit times and pulse widths.

17. Apparatus in accordance with claim 1, characterized in that the electronic control and evaluation system (10) includes a microprocessor.

18. Apparatus in accordance with claim 1, characterized in that the opto-electronic photodetector is a photodiode, in particular an avalanche diode (23).

19. A laser range finding apparatus comprising a pulsed laser directing light pulses towards an object that is spaced from the apparatus; a photodetector receiving light pulses reflected by the object; an evaluation circuit generating distance signals reflecting a distance between the object and the apparatus from a pulse transit time between a transmission and reception of light pulses by the apparatus using the speed of light; a deflector arranged between the laser and the object for angularly deflecting sequential light pulses to change their angular positions relative to the object; a transmitter sending to the evaluation circuit angular position signals representative of the angular positions of the sequential light pulses; the evaluation circuit being adapted to determine the distance between the object and the apparatus from the distance signal and the angular position signal; a control circuit operatively connected with the evaluation circuit for measuring at least one of an electrical charge which has flowed through the photodetector during the reception of a light pulse and a pulse width of a received light pulse; and a reference object located at a defined distance from the apparatus; the evaluation circuit further generating needed correction values for correcting errors in the distance signals caused by signal dynamics by comparing the at least one of the electrical charge which has flowed through the photodetector and the pulse width with at least one of a corresponding electrical charge which has flowed through the photodetector and a pulse width resulting from a reference laser light pulse reflected by the object.

20. Apparatus according to claim 19 wherein different portions of the reference object have different reflectivities.

21. Apparatus according to claim 19 wherein the evaluation circuit generates the correction values also as a function of a pulse transit time of the reference laser light pulse.

* * * * *